July 6, 1937.　　　I. P. SMITH　　　2,086,244
ARM REST FOR AUTOMOBILES
Filed Sept. 30, 1935
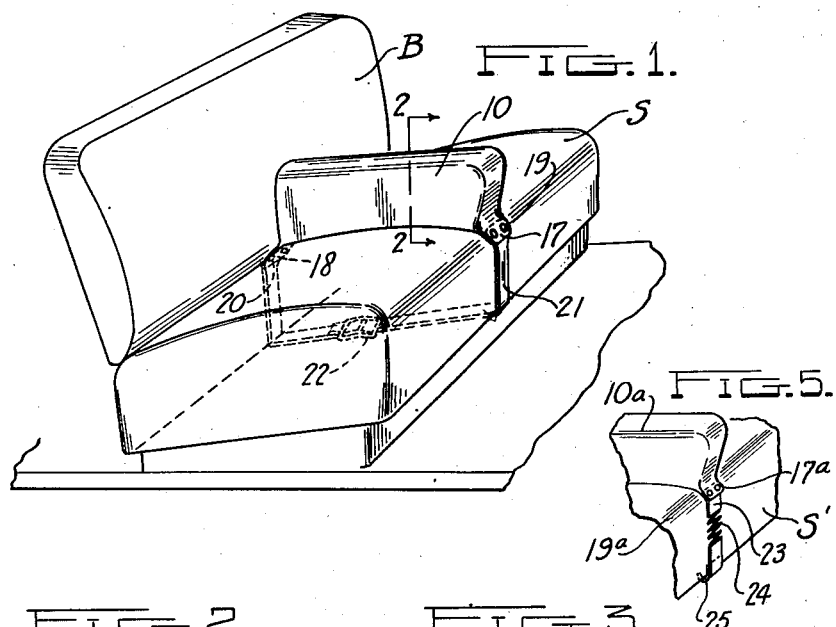
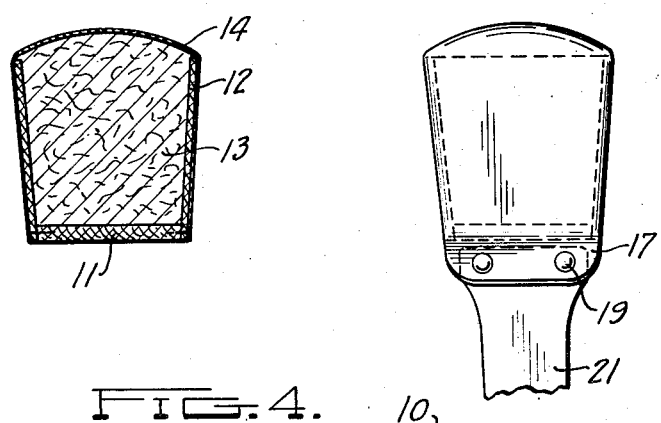
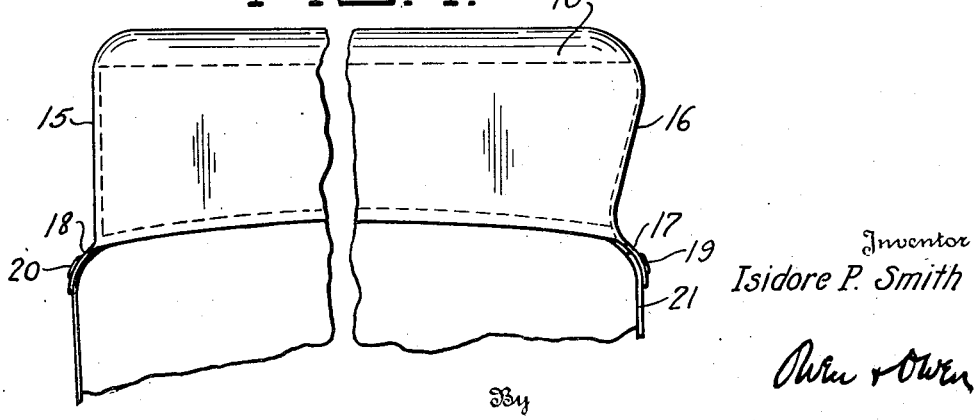
Inventor
Isidore P. Smith
By Owen & Owen
Attorney Patented July 6, 1937

2,086,244

UNITED STATES PATENT OFFICE 2,086,244

ARM REST FOR AUTOMOBILES

Isidore P. Smith, Perrysburg, Ohio, assignor to The Hettrick Manufacturing Company, Toledo, Ohio, a corporation of Ohio Application September 30, 1935, Serial No. 42,736

2 Claims. (Cl. 155—112)

This invention relates to arm rests for the seats of vehicles, such as automobiles, and an object is to produce a simple and inexpensive arm rest, which can be installed without the use of special tools or equipment, and can be sold as an accessory, to be applied to vehicles now in use, the structure being such that it can be readily detached when not desired or adjusted to different positions, either for use in the central portion of the seat or at either side.

One embodiment of the invention is shown on the accompanying drawing, in which:

Figure 1 is a perspective view of an automobile seat and back showing the arm rest mounted thereon in position of use;

Figure 2 is an enlarged sectional view on the line 2—2 of Figure 1;

Figure 3 is an end view of the arm rest attached to the strap or band;

Figure 4 is an enlarged sectional elevation of a seat cushion with the arm rest attached thereto; and Figure 5 is a fragmentary perspective view on a reduced scale showing an alternate means of securing the arm rest to the seat cushion.

The illustrated embodiment of the invention comprises an arm rest 10, which is generally rectangular in shape, and consists of a bottom panel or wall 11, which is curved slightly to fit the contour of a seat cushion S of a vehicle, such as an automobile, the back cushion B extending upwardly from the rear end of the seat cushion S in the usual manner. The bottom wall 11 may be of wood, metal, or any suitable material, and rising therefrom and secured thereto as by screws or nails, are side walls 12, which may be wood, fiber-board, or any suitable material. Filling the space between the side walls 12 is a material 13, which is preferably soft and yieldable, such as hair, felt, or other materials used for upholstery. Covering the side walls and extending over the top is a flexible covering 14 of fabric, leather, or any similar material. As shown particularly in Figure 4, the rear end portion 15 of the arm rest is vertically disposed to fit snugly against the back cushion B and the front portion 16 curves outwardly and then downwardly to present a pleasing appearance.

Extending from the lower portion of the front and rear arm rest 10 are flaps 17 and 18 respectively, which may be of the same material as the covering 14 and integral therewith. Each of the flaps 17 and 18 is equipped with a pair of snap fasteners 19 to snap on to fasteners 20 on a strap or band 21. In this instance, the strap 21 extends entirely around the seat cushion S and has a buckle 22, which is preferably disposed on the underside of the seat cushion S. A portion of the strap 21 against which the arm rest contacts, may be of substantially the width of the arm rest, whereas, the remainder of the strap is narrower, as indicated in Figure 3.

It will be understood that in use the strap 21 is slipped around the seat cushion S and is secured in position by the buckle 22. The arm rest is placed on the strap, and by snapping the fasteners 19 and 20 together, the arm rest is quickly and conveniently mounted in position for use. The strap 21 may encircle the seat cushion S in the central portion thereof in order to position the arm rest between two persons, or, if desired, an arm rest may be disposed one at each end of the seat cushion. It is apparent that the device is adjustable longitudinally of the seat cushion and can be arranged as desired. If the arm rest is not needed it can be readily disengaged from the strap to enable the full length of the seat cushion to be used.

The alternate form of the invention shown in Figure 5 comprises an arm rest 10a having tabs 17a at opposite ends, and for securing the arm rest to the seat S' a strap 23 is connected to the tabs 17a by detachable fasteners 19a, and in this instance a serpentine spring 24 is disposed between portions of the strap to give it sufficient resilience. Connected to the outer end of the strap is a hook 25, which is adapted to hook against the lower edge portion of the seat to hold the arm rest in place. It will be understood that a similar attaching device is provided on the opposite end of the arm rest.

It is to be understood that numerous changes in details of construction, arrangement, and choice of materials, may be effected without departing from the spirit of the invention, especially as defined in the appended claims.

What I claim as new and desire to secure by Letters Patent is:

1. An attachment for an automobile seat comprising an arm rest having a base shaped to fit the seat, side walls and a covering therefor, a strap adapted to encircle the seat with the ends attached under the seat, a flap on each end of the arm rest, and means for detachably connecting said flaps and strap, the strap being disposed substantially in the vertical plane of the arm rest whereby the occupants do not sit on the strap.

2. An attachment for vehicles having seat and back cushions, comprising an upholstered rectangular box-like arm rest disposed transversely of the seat cushion and having its base shaped to conform thereto, the rear wall of the arm rest substantially abutting the back cushion and shaped to conform therewith and the front end disposed close to the front of the seat cushion, attaching means for the arm rest including a flexible strap secured to said arm rest and extending downwardly in embracing relation to the adjacent wall of the seat cushion, thence transversely to the opposite wall thereof and thence upwardly along such opposite wall to the opposite end of the arm rest, and detachable fastening means connecting said opposite end of the strap to the arm rest, opposite ends of the arm rest having extensions to which said strap is connected, said strap being disposed substantially in the vertical plane of the arm rest whereby the occupants of the seat do not sit on the strap.

ISIDORE P. SMITH.